(12) United States Patent
Yasumatsu et al.

(10) Patent No.: US 6,412,520 B1
(45) Date of Patent: Jul. 2, 2002

(54) HOSE FOR FUEL PIPING

(75) Inventors: Hihumi Yasumatsu; Shigeto Oga; Tadashi Kasamoto; Tsutomu Miyake, all of Okayama-ken (JP)

(73) Assignee: Marugo Rubber Industries, Ltd., Okayama-ken (JP)

( * ) Notice: Subject to any disclaimer, the term of this patent is extended or adjusted under 35 U.S.C. 154(b) by 0 days.

(21) Appl. No.: 09/843,006

(22) Filed: Apr. 26, 2001

(51) Int. Cl.[7] .................................. F16L 11/11
(52) U.S. Cl. ..................... 138/141; 138/137; 138/121; 138/DIG. 7; 428/35.7
(58) Field of Search ............... 428/35.9, 36.9, 428/35.7; 138/137, 141, 140, 121, 118, 109, DIG. 7

(56) References Cited

U.S. PATENT DOCUMENTS 5,588,469 A * 12/1996 Kakiuchi et al. ........... 138/125
6,321,794 B1 * 11/2001 Ishida et al. ............... 138/121

FOREIGN PATENT DOCUMENTS

| JP | 6-221481 | 9/1994 | |
| JP | 7-205327 | 8/1995 | |
| JP | 2000-319614 | * 11/2000 | |
| JP | 2000-329266 | * 11/2000 | ................ 138/137 |

* cited by examiner

Primary Examiner—Patrick Brinson
(74) Attorney, Agent, or Firm—Martin Fleit; Paul D. Bianco

(57) ABSTRACT

There is provided a hose for fuel piping which has an inner layer portion having a single layer of a thermoplastic resin having a low fuel permeability, the inner layer portion has a thickness of at least 0.3 mm at a maximum thickness portion, and an outer layer portion of a thermoplastic elastomer. The inner layer portion is laminated to the outer layer portion by a bond strength of 0.6 kgf/cm or less. In a modification, the inner layer portion of a thermoplastic resin having a low fuel permeability can be coated with a thermoplastic resin.

15 Claims, 1 Drawing Sheet

HOSE FOR FUEL PIPING

BACKGROUND OF THE INVENTION

This invention relates to a hose for fuel piping purposes and more particularly to multi-layered or laminated hose for fuel piping used for, for example, automotive purposes.

Evaporation and/or transpiration of fuels from various types of fuel tanks raises serious problems of environmental pollution and destruction of environment. Thus, there is a social tendency to impose legal controls on such evaporation and transpiration of fuels and, actually, in the United States there is a regulation which imposes a legal control on cars and automobiles to regulate the transpiration to a maximum level of 2 g/24 hrs or less. Moreover, it is now suggested to amend this regulation to be four times severer at one effort than ever for the cars as from the 2004 year model.

A conventional fuel hose has a multi-layered structure having an inner layer made of synthetic resin material which has a low fuel permeability. However, in order to meet the severe requirement of restriction in transpiration, developments, new contrives and modifications have been demanded strongly with respect to materials and structure thereof.

Recently, it has been preached to collect various kinds of material for recycling purposes. The hose for fuel piping which requires flexibility, weatherability (that is, atmospheric corrosion resistance or weather proof and flame resistance generally has an outer layer of rubber. However, it is extremely difficult to successfully proceed recycling of rubber and this requires a high cost. In addition, since the conventional hose has a structure that an inner layer of synthetic resins and an outer layer of rubber are firmly adhered or welded to each other, such a structure makes it quite difficult to proceed recycling of resins although the resin is inherently recycled relatively easily.

In order to meet with the requirements for prevention of fuel transpiration, many attempts have been made as disclosed in Japanese Patent Publications (Unexamined) No. 6-221481 and No. 7-205327 and these attempts are largely classified into three types of structure, as described below.

(a) a multi-layered rubber hose made of FKM (fluororubber, fluorocarbon rubber);

(b) a nylon type resin hose with an outer circumferential coverage of rubber hose, which is made by inserting a resin hose element into a separately is formed rubber hose element; and (c) a rubber hose with an inner circumferential lining of nylon type resin adhered to an inner surface of the rubber hose, which is produced by spraying resin powder to an inner surface of the vulcanized rubber hose.

The multi-layered rubber hose of type (a) is inherently made of a rubber and therefore it is less permeability-resistant. Thus, in order to meet and satisfy the new and severer regulation described above, a substantial increase in thickness of the hose is required, which results in substantial increase of production cost and increase of weight, and consequently brings about some difficulties in recycling.

With respect to the resin hose of type (b), it has a basic problem that the nylon type resin is not adaptable to alcohol, and when nylon type resin is molded by blowing, drawdown appears violently to result in difficulty in control of thickness. In this structure, although the inner and outer layers are not adhered to each other and only the inner layer of nylon type resin can be recycled, the outer layer of rubber is not easily recycled.

The hose of type (c) is similar with the type (b) in a sense that nylon type resin is used. However, the nylon type resin of type (c) hose is firmly adhered to the rubber hose and therefore it is very difficult to proceed recycling as well as rubber itself.

SUMMARY OF THE INVENTION

It is, therefore, an object of the present invention to provide a new laminated hose which meets the requirement of the forthcoming new regulation of transpiration and permits easy recycling and reduction of weight as well as production cost.

According to the present invention, there is provided a hose for fuel piping comprising:

an inner layer portion having a single layer of a thermoplastic resin of a low fuel permeability, the inner layer portion having a thickness of at least 0.3 mm at a maximum thickness portion thereof, and an outer layer portion of a thermoplastic elastomer, wherein the inner layer portion is laminated to the outer layer portion by a bond strength of 0.6 kgf/cm or less.

In a modification of the structure described above, the inner layer portion of a thermoplastic resin having a low fuel permeability can be coated with a thermoplastic resin to thereby form into a multi-layer structure.

In the hose of the present invention, since the inner layer portion has a single layer of a thermoplastic resin having a low fuel permeability or otherwise the thus formed single layer is coated with a thermoplastic resin to form a multi-layer structure of the inner layer portion, the inner layer of either configuration has a low fuel permeability material and, therefore, the hose of the invention can meet with the requirements of the new, severer regulation. Further, in either case of the inner layer portion, a single layered and multi-layered configurations, the maximum thickness portion of the inner layer portion is set as thick as 0.3 mm or more, the structure is satisfactory for both strength and rigidity for the purpose of maintaining the shape of the hose. On the other hand, the outer layer portion which is made of a thermoplastic, rubber-like elastomer can satisfactorily meet the requirements such as flexibility, shock-resistance, weatherability, etc.

Further, the inner layer portion and the outer layer portion are laminated with each other by a bond strength of 0.6 kgf/cm or less at a normal condition and, therefore, each of the inner layer portion and the outer layer portion can be peeled off or removed from each other and consequently both the inner and outer layer portions can be recycled. The term "bond strength" used herein intends to mean a peel strength specified by JIS (Japan Industrial Standards) K6330-6. This value of the bond strength, which is 0.6 kgf/cm or less as defined in the present invention, is a bond strength which can be obtained without any specially positive bonding treatments and which is a natural bonding strength generated and obtained at the time of a simultaneous molding of the both inner layer portion and the outer layer portion. Thus, the value of the bond strength described above is such a strength that removal can be effected easily by manual peeling operation.

DETAILED DESCRIPTION OF THE PREFERRED EMBODIMENT

Figure 1:
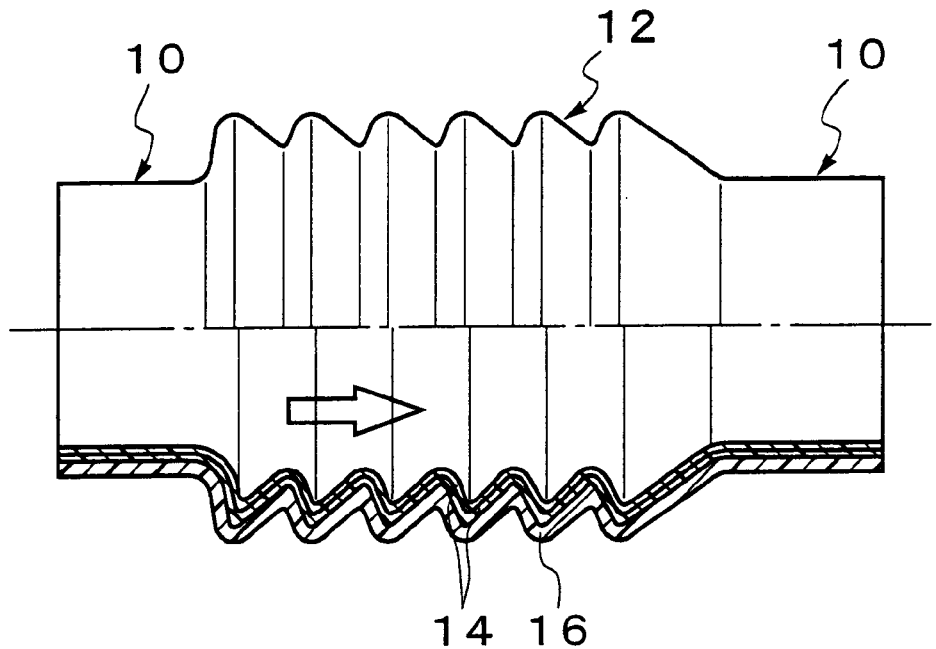
FIG. 1 is a partly sectioned side view of a hose according to an a embodiment of the present invention.

With reference to FIG. 1 which shows a first embodiment of the present invention, a hose as a complete product has end portions 10, 10 of a linear tubular shape and a middle portion 12 between the end portions. The linear tubular shape of the end portions 10 facilitates and ensures reliable coupling with separate or another tubular elements or parts to be connected.

Figure 2:
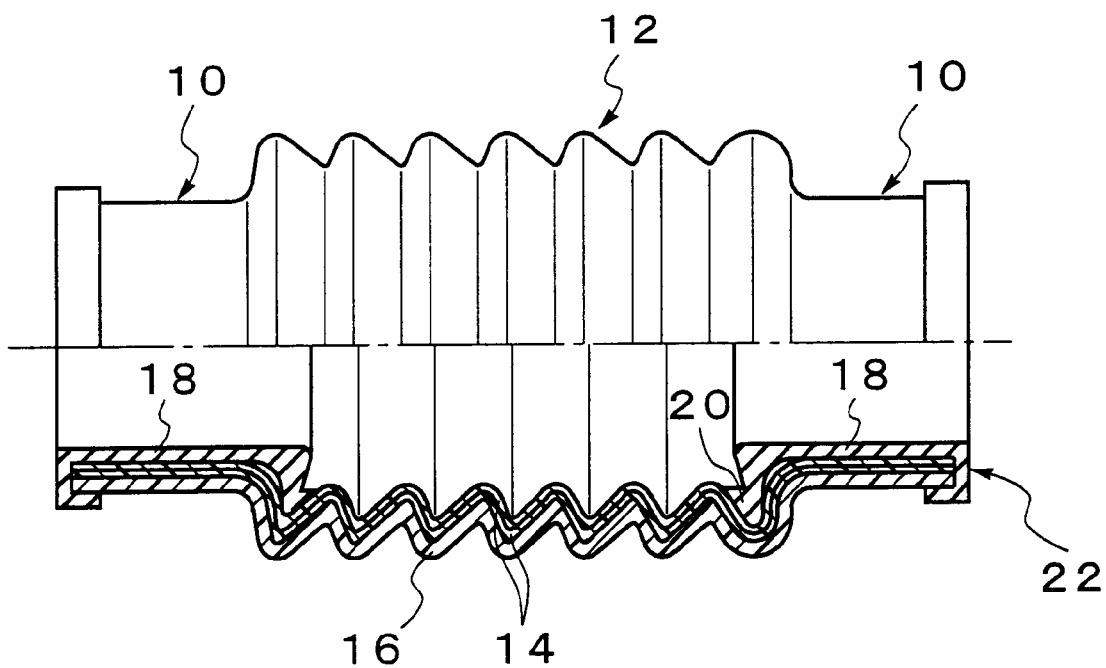
FIG. 2 is a partly sectioned side view of a hose according to another embodiment of the present invention.

By contrast, the middle portion 12, which can be formed into a linear tubular shape if desired, is generally formed into bellows structure taking an account of flexibility and shock absorption property at the time of collision or any accidents to cars. The bellows structure in the hose of the present invention will be important in the hose of the present invention because the synthetic resins are used for all the hose elements of the invention and therefore the hose becomes rather rigid and less flexible. With respect to the bellows structure, it is preferred that a serrated or saw-tooth shaped structure (or louver door shaped) is adapted so that major wall surface of the saw-toothed inner wall extends in the direction of fuel-flowing as illustrated in FIGS. 1 and 2, rather than a general shape of bellows (not shown) which has same shape of crests and troughs in a regular arrangement, in view of less resistance to flowing of fuel when the fuel flows in the direction as shown by an arrow in FIG. 1. The thus formed hose may be straight or otherwise curved from the beginning.

The hose can be produced by any suitable method such as extrusion process and blow molding. In either methods of production, a plurality of layers of different materials can be simultaneously produced. In the present invention, the blow molding is more preferable since it can be adapted to complex shapes of products and provide thickness control. In general, when a blow molding technique is used to form a product of relatively large thickness, there is a shortcoming that drawdown is generated to make it difficult to have a precise control of thickness. In the present invention, however, a thermoplastic resin material is coated with a thermoplastic elastomer which has less lowering of viscosity and proceeded by a simultaneous blow molding, and this will effectively prevent generation of drawdown of the resin material, so that an accurate control of the thickness can be realized.

The hose of the present invention has a laminated structure composed of an inner layer portion 14 and an outer layer portion 16. The inner layer portion 14 serves to secure anti-permeability of fuel and maintain the shape. In the present invention, the inner layer portion 14 is formed with either a single layer or a multi-layer configuration. In case of a single layer configuration, all the inner layer portion 14 is formed of a resin having a low fuel-permeability so that a required anti-permeability of fuel and maintenance of the shape are obtained. As examples of the low fuel-permeability resins, fluororesins, particularly terpolymer of TFE (tetrafluoroethylene), HFP (hexafluoropropylene) and VDF (vinylidene fluoride), which is commercially available as a trade name THV, produced by Dyneon LLC, Minnesota, USA. The terpolymer THV is soft enough to satisfy workability and has prominent anti-permeability characteristics.

As other examples of suitable low fuel-permeability resins, aliphatic polyketone resin, copolymer of ethylene vinyl alcohol, polyphenylenesulfide resin can be used as well since these have a suitable anti-permeability of fuel which meets the new regulation of anti-transpiration described above.

By contrast, with respect to the multi-layered structure of the inner layer portion 14, the resin having a low fuel-permeability is coated with the other resin and a shape-maintaining property is burdened by the other resins such as fluororesins, nylon type resins, polyolefin type resins which are advantageous in respect of cost reduction. As the fluororesins which are rather costly, recycled fluororesins can be used for cost reduction purposes. In case of the multi-layered structure, it should be noted that the inner layer of low fuel-permeability resin has a suitable thickness so that it has a sufficient anti-permeability characteristics relative to the fuel.

An entire thickness of the inner layer portion 14 is set 0.3 mm or more at the maximum thickness portion thereof. This will secure a required mechanical strength and rigidity. Although there is not a strict upper limitation of the thickness, about 3.0 mm or less will be preferable so as to avoid over-rigidity. Further, it would be preferred that the innermost layer of the inner layer portion 14 be destaticized or proceeded with a suitable destaticization method by, for example, adding conductive particles. This will prevent explosion due to ignition by static electricity when the fuel is being fed through the hose.

The outer layer portion 16 serves to protect the inner layer portion 14 and is required to have flexibility, impact resistance, weatherability, flame resistance, etc. In the present invention, a thermoplastic elastomer which herein intends to mean a thermoplastic resin which is added with complete crosslinking or semi-crosslinking rubber to have a rubber-like nature. Examples of the thermoplastic elastomer are TPO (thermoplastic olefin), thermoplastic NBR (nitrile butadiene rubber) type alloy, thermoplastic chlorinated polyethylene type alloy, etc. A thickness of the outer layer portion 16 is set approximately 1.0 to 3.0 mm.

The hose of the present invention can be formed by blow molding process, which permits a simultaneous production of the both inner layer portion 14 and outer layer portion 16. In the blow molding process which enables to easily control a thickness of a product as mentioned above, it is preferred that a thickness of the end portions 10, 10 be smaller than a thickness of the middle portion 12, and more specifically, the end portions 10, 10 preferably have a thickness which is about 20 to 90% of a thickness of the middle portion 12.

The inner layer portion 14 is composed mainly of less resilient resin and the inner layer portion 14 of the end portion 10 is inserted onto and coupled with separate pipes (not shown) and, therefore, if the end portions 10, 10 have a larger thickness than required, there are undesirable cases that insertion and coupling are not suitably achieved. This is the reason why a thickness of the end portions 10, 10 be preferably made smaller than a thickness of the middle portion 12 of the hose. In case of a maladjusted insertion, less coupling effect must be expected and, in that case, there will be a fear of leakage of fuel from the coupled portion. In addition, in the present invention, the inner layer portion 14 which has a low fuel-permeability is formed along the entire length of the inserted portion and, therefore, this will prevent transpiration of fuel from a surface of the inserted portion. By contrast, in the conventional prior art hoses which have end portions substantially made of rubber only and, in such hoses fuel is likely to penetrate through the rubber portion and, consequently, transpiration of fuel from the inserted portion becomes unavoidable.

For the purpose of providing complementary sealing effect, end sealing members 18 are preferably inserted into an inner circumference of the inner layer portion 14 of each of the end portions 10 as shown in FIG. 2. In the structure of FIG. 2, the end sealing members 18 are inserted into the inner layer portion 14, from the ends thereof. As far as recycling is concerned, however, it is not desired that the end sealing member 18 is adhered, with an adhesive agent, to the inner circumference of the inner layer portion 14. Instead, a mere insertion and fixture is suitable. In a preferred embodiment, the sealing end members 18 may have a suitable engagement structure 20 (or 20 and 22) which is or are engaged with the inner layer portion 14 to thereby restrict its own displacement in an axial direction. The engagement structure 18 has the same structure at its end portions 10 to permit the sealing end members 18 to be adapted to either end portions 10 and 10.

In this structure, it is preferred that an outer diameter of the end sealing members 18 is slightly larger than an inner diameter of the end portions 10 so that more effective sealing can be realized. Further, when it is inevitable that the end sealing members 18 are adhered to the inner layer portion 14 by using an adhesive agent so as to realize a reliable sealing, it is preferred that the end sealing member 18 be adhered at the very limited portion of an inner end 20 and its vicinity only. Although the end sealing member 18, if adhered to the inner layer portion 14 of the hose, will increase an insertion load of a separate pipe to be coupled and this will provide difficulty in insertion, the limited portion of the inner end 20 for adhesion as described above will completely prevent the fuel from penetrating into a space between the end sealing member 18 and the inner layer portion 14 without providing any adverse influence. In addition, it will be preferred to providing a coating of lubricant on a suitable portion of the inner surface of the end sealing member 18 so that an insertion of the hose to the separate pipes can be enhanced. Preferably, the lubricant coating is proceeded by a thermo-setting technique which generally results less peeling off or removal.

According to the present invention, since the inner layer portion is composed mainly of a low fuel-permeability resin on its inner surface, the hose thus formed can satisfy the necessary conditions of the aforementioned new regulation. Further, since the outer layer portion is composed mainly of a thermoplastic elastomer, it can provide suitable flexibility, shock resistance and weatherability. In addition, both the inner and outer layer portions are made of resins (that is, without use of rubber), the hose itself can be recycled and each of the layer portions is not adhered strongly and, therefore, each of the elements forming the hose can be recycled separately. Particularly, if expensive fluororesins are not capable of being recycled, it will reflect largely on the production cost of the product but, in the present invention, these can be recycled. Further, since no rubber is used at all or otherwise a very limited amount of rubber is locally used as an end sealing member, the final product can meet a weight saving requirement. In addition, since no adhesion is required between the inner layer portion and the outer layer portion, selection freedom of materials to be used for these portions can be enlarged and, accordingly, various combination and adoption of suitable materials can be made.

Although the present invention has been described with reference to the preferred embodiments only, many modifications can be made within the spirit of the invention.

What is claimed is:

1. A hose for fuel piping comprising:

an inner layer portion having a single layer of a thermoplastic resin of a low fuel permeability, the inner layer portion having a thickness of at least 0.3 mm at a maximum thickness portion thereof, and an outer layer portion of a thermoplastic elastomer, wherein the inner layer portion is laminated to the outer layer portion by a bond strength of 0.6 kgf/cm or less.

2. A hose for fuel piping according to claim 1, wherein the inner layer portion of a thermoplastic resin having a low fuel-permeability is coated with a thermoplastic resin to form a multi-layer structure of the inner layer portion.

3. A hose for fuel piping according to claim 1, wherein an innermost layer of the inner layer portion is destaticized.

4. A hose for fuel piping according to claim 1, wherein the thermoplastic resin having a low fuel permeability is selected from fluororesins.

5. A hose for fuel piping according to claim 4, wherein the fluororesins are terpolymers of TFE (tetrafluoroethylene), HFP (hexafluoropropylene) and VDF (vinylidene fluoride), commercially available as a trade name THV produced by Dyneon LLC, a corporation of USA.

6. A hose for fuel piping according to claim 1, wherein the low permeability resin of fuel is selected from aliphatic polyketone resin, copolymer of ethylene vinyl alcohol, and polyphenylenesulfide resin.

7. A hose for fuel piping according to claim 2, wherein the the resin coating the low fuel-permeability resin is selected from fluororesins, nylon resins, and polyethylene resins.

8. A hose for fuel piping according to claim 1, wherein the thermoplastic elastomer for the outer layer portion is selected from TPO (thermoplastic olefin), thermoplastic NBR (nitrile butadiene rubber) type alloy, and thermoplastic chlorinated polyethylene type alloy.

9. A hose for fuel piping according to claim 1, wherein the inner layer portion and the outer layer portion are simultaneously formed by a blow molding technique.

10. A hose for fuel piping according to claim 1, wherein the hose has end portions and a middle portion confined between the end portions, and the end portions have a thickness of 20 to 90% of a thickness of the middle portion.

11. A hose for fuel piping according to claim 1, wherein the middle portion is formed into bellows structure having a saw-tooth shape such that crests and troughs of the saw-tooth shape are extended in one direction.

12. A hose for fuel piping according to claim 1, wherein the hose has, at its opposite end portions, an end sealing member fitted to an inner circumference of the inner layer portion, and an engagement structure is provided to the end sealing member to thereby prevent removal.

13. A hose for fuel piping according to claim 12, wherein the end sealing member is coupled with the inner layer portion of the hose without adhesive agent.

14. A hose for fuel piping according to claim 12, wherein the end sealing member is coupled with the inner layer portion of the hose by using an adhesive agent at a limited portion of an end of the end sealing member.

15. A hose for fuel piping according to claim 12, wherein the end sealing member has a coating of lubricant on a suitable portion of an inner surface of the end sealing member.

* * * * *